United States Patent
Ibaragi

(10) Patent No.: US 9,887,559 B2
(45) Date of Patent: Feb. 6, 2018

(54) POWER FEEDING DEVICE AND POWER RECEIVING DEVICE FOR CONTACTLESS POWER TRANSMISSION

(71) Applicant: Murata Manufacturing Co., Ltd., Nagaokakyo-shi, Kyoto-fu (JP)

(72) Inventor: Hiroshi Ibaragi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 243 days.

(21) Appl. No.: 14/937,966

(22) Filed: Nov. 11, 2015

(65) Prior Publication Data

US 2016/0064954 A1 Mar. 3, 2016

Related U.S. Application Data

(63) Continuation of application No. PCT/JP2014/051955, filed on Jan. 29, 2014.

(30) Foreign Application Priority Data

May 14, 2013 (JP) .................................. 2013-101969

(51) Int. Cl.
*H01F 38/00* (2006.01)
*H02J 5/00* (2016.01)
(Continued)

(52) U.S. Cl.
CPC .............. *H02J 5/005* (2013.01); *G01K 1/026* (2013.01); *G01K 7/22* (2013.01); *G01K 13/00* (2013.01);
(Continued)

(58) Field of Classification Search
None
See application file for complete search history.

(56) References Cited

U.S. PATENT DOCUMENTS 8,624,546 B2 * 1/2014 Jung .................. H02J 7/025
320/108

2014/0111019 A1 * 4/2014 Roy ........................ G01V 3/081
307/104
2016/0064953 A1 * 3/2016 Ibaragi ................... H01F 38/14
307/104

FOREIGN PATENT DOCUMENTS

JP  11-178202 A  7/1999
JP  2008-017562 A  1/2008
(Continued)

OTHER PUBLICATIONS

Official Communication issued in International Patent Application No. PCT/JP2014/051955, dated Mar. 11, 2014.

*Primary Examiner* — Cassandra Cox
(74) *Attorney, Agent, or Firm* — Keating & Bennett, LLP

(57) ABSTRACT

A power feeding device includes a cover, a primary coil covered with the cover and provided in a predetermined direction with respect to the cover, and a temperature-sensitive detector that detects the temperature of an object on the cover. When the distance from the surface of the cover to the temperature-sensitive detector in the predetermined direction is denoted by L [m], the temperature of the object to be subjected to thermometry by the temperature-sensitive detector is denoted by $T_0$ [K], the temperature to be detected by the temperature-sensitive detector is denoted by $T_1$ [K], and the thermal conductivity of the cover is denoted by $\lambda$ [W/(m·K)], L satisfies the following equation $$L \leq \frac{\lambda \times (T_0 - T_1)}{5 \times T_1}. \quad (1)$$

This allows the temperature of the object on the cover to be accurately detected.

20 Claims, 3 Drawing Sheets

(51) Int. Cl.
*H02J 50/10* (2016.01)
*H02J 7/02* (2016.01)
*H02J 50/60* (2016.01)
*G01K 1/02* (2006.01)
*G01K 13/00* (2006.01)
*G01K 7/22* (2006.01)
*H02J 7/35* (2006.01)
*H02J 17/00* (2006.01)

(52) U.S. Cl.
CPC .............. *H02J 7/025* (2013.01); *H02J 7/355* (2013.01); *H02J 50/10* (2016.02); *H02J 50/60* (2016.02); *H02J 17/00* (2013.01)

(56) References Cited

FOREIGN PATENT DOCUMENTS

| | | |
|---|---|---|
| JP | 2009-264803 A | 11/2009 |
| JP | 2010-252538 A | 11/2010 |
| JP | 2010-288429 A | 12/2010 |
| JP | 2011-222773 A | 11/2011 |
| JP | 2012-228123 A | 11/2012 |
| JP | 2013-005682 A | 1/2013 |
| JP | 2013-017247 A | 1/2013 |
| JP | 2013-030551 A | 2/2013 |
| WO | 2012/047779 A1 | 4/2012 |

* cited by examiner

POWER FEEDING DEVICE AND POWER RECEIVING DEVICE FOR CONTACTLESS POWER TRANSMISSION

BACKGROUND OF THE INVENTION

1. Field of the Invention

The present invention relates to a power feeding device and a power receiving device that transmit and receive power to and from a device in a contactless manner.

2. Description of the Related Art

Conventionally, examples of this type of power feeding device and power receiving device include, for example, devices as described in Japanese Patent Application Laid-Open No. 2013-017247. This power feeding device includes a primary coil that generates a magnetic flux when an alternating current flows, a cover that covers the primary coil, and a sheet-like temperature-sensitive sensor that detects the temperature of an object (foreign object or power receiving device) on the cover. Thus, during power transmission, the temperature-sensitive sensor is used to detect a temperature increase on the cover, thereby detecting the presence of the object on the cover.

In the power feeding device, the coil is disposed on a support that causes an electromagnetic field to pass therethrough, which is made from an insulating material, and the cover is attached to the support so as to cover the coil. The temperature-sensitive sensor is disposed above the coil and inside the cover. The temperature-sensitive sensor is able to be disposed on the top surface of the cover or inside the cover (that is, between the top surface and the rear surface). The power receiving device is also able to be provided with a temperature-sensitive sensor as in the case of the power feeding device.

However, the power feeding device, etc. has a problem that, depending on the position of the temperature-sensitive sensor, when an object is placed on the cover, the temperature of the object may be unable to be accurately detected.

SUMMARY OF THE INVENTION

Preferred embodiments of the present invention provide a power feeding device and a power receiving device which are able to accurately detect the temperatures of an object on a cover.

According to an aspect of various preferred embodiments of the present invention, a power feeding device and a power receiving device for transmitting and receiving power in a contactless manner to and from a power receiving device include a cover, a coil covered with the cover and provided in a predetermined direction with respect to the cover, and a temperature-sensitive detector that detects a temperature of an object on the cover.

When the distance from the surface of the cover to the temperature-sensitive detector in the predetermined direction is denoted by L [m], the temperature of the object to be subjected to thermometry by the temperature-sensitive detector is denoted by $T_0$ [K], the temperature to be detected by the temperature-sensitive detector is denoted by $T_1$ [K], and the thermal conductivity of the cover is denoted by $\lambda$ [W/(m·K)], L satisfies the following equation (1).

Formula 1

$$L \leq \frac{\lambda \times (T_0 - T_1)}{5 \times T_1} \quad (1)$$

According to the aspect described above, the design such that the distance L from the surface of the cover to the temperature-sensitive detector has a numerical value defined by the above equation (1) makes it possible to accurately detect the temperature of the object on the cover.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A power feeding device according to a preferred embodiment of the present invention will be described below with reference to the drawings.

Figure 1:
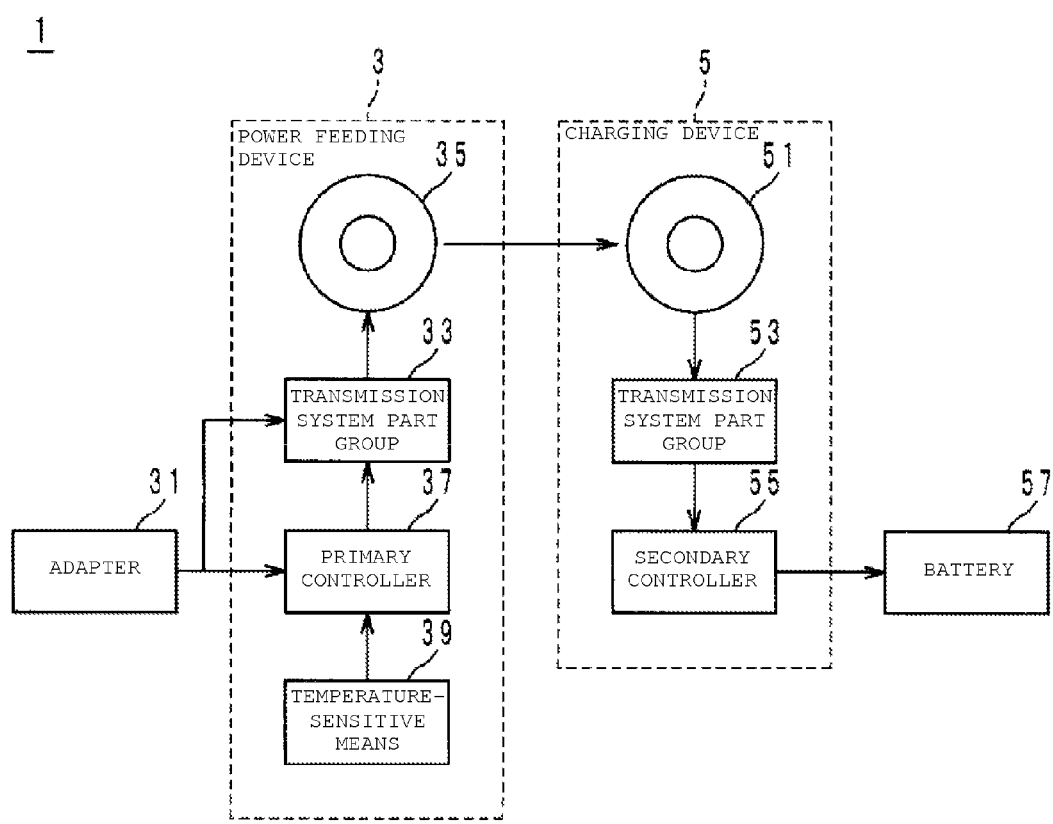
FIG. 1 is a block diagram illustrating the configuration of a contactless power transmission system including a power feeding device and a power receiving device according to a preferred embodiment of the present invention.

In FIG. 1, a contactless power transmission system 1 includes a power feeding device 3. The power feeding device 3, in order to charge a power receiving device 5 such as a smartphone or a tablet, generally includes an adapter 31, a transmission system part group 33, a primary coil 35, a primary controller 37, and a temperature-sensitive detector 39. In this regard, the part group 33, the coil 35, and the controller 37 are, as shown by dashed lines in FIGS. 2A and 2B, disposed on a base 311, and covered with a cover 313. In contrast, the power receiving device 5 includes, as shown in FIG. 1, a secondary coil 51, a transmission system part group 53, and a secondary controller 55. Details and operations for each component will be described below.

When the power receiving device 5 is placed on the cover 313 of the power feeding device 3, power transmission is started from the power feeding device 3 to the power receiving device 5. During the power transmission, the adapter 31 supplies an alternating-current voltage (for example, 100 V) from a commercial power supply, to the transmission system part group 33. The transmission system part group 33 includes at least one of a rectifier circuit, a smoothing circuit, an inverter circuit, etc. The rectifier circuit and the smoothing circuit convert the input alternating-current voltage to a direct-current voltage. The inverter circuit performs switching or the like of the output direct-current voltage from the smoothing circuit to generate an alternating-current voltage with a predetermined frequency (for example, several tens kHz). When this alternating-current voltage is applied to the coil 35, the coil 35 generates an alternating-current magnetic field. The foregoing operation is controlled by the controller 37.

On the other hand, when the power receiving device 5 is placed on the cover 313 of the power feeding device 3, the secondary coil 51 is located over the primary coil 35 with the cover 313 interposed therebetween. Therefore, the alternating-current magnetic field generated by the coil 35 undergoes interlinkage with the coil 51, and an alternating-current voltage is induced across both ends of the coil 51, and supplied to the transmission system part group 53. The transmission system part group 53 includes a rectifier circuit, etc., and rectifies a current flowing with the induced voltage, and supplies the rectified current to the battery 57 disposed outside the power receiving device 5. Thus, the battery 57 is charged. The foregoing operation is controlled by the controller 55.

Overheating Detection

On the cover 313, not only the power receiving device 5 is placed, but also metal foreign bodies may be located thereon. In order to detect abnormal overheating of the objects (the power receiving device 5 and metal foreign bodies), the power feeding device 3 is provided with the temperature-sensitive detector 39.

Figure 2A:
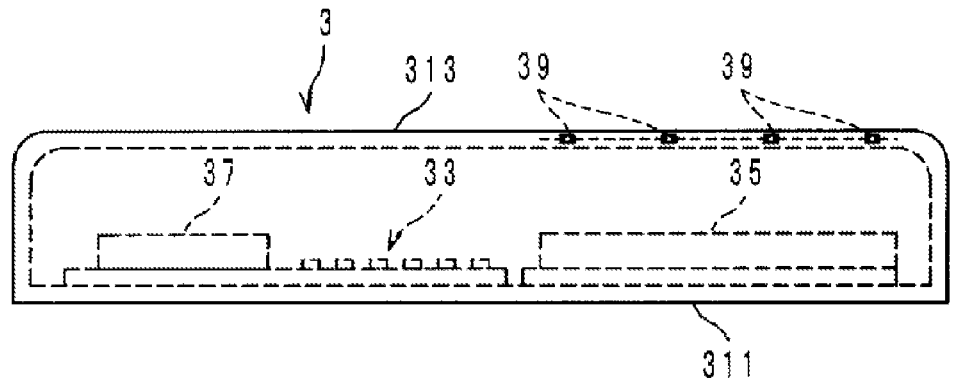
FIG. 2A is a side view of the power feeding device shown in FIG. 1.
Figure 2B:
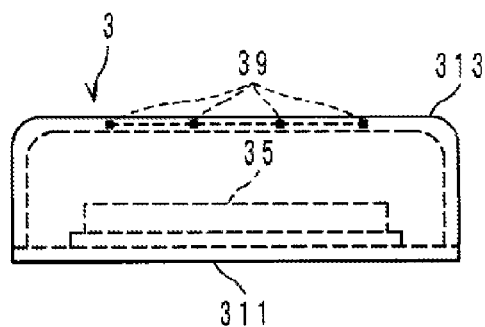
FIG. 2B is a front view of the power feeding device shown in FIG. 1.
Figure 2C:
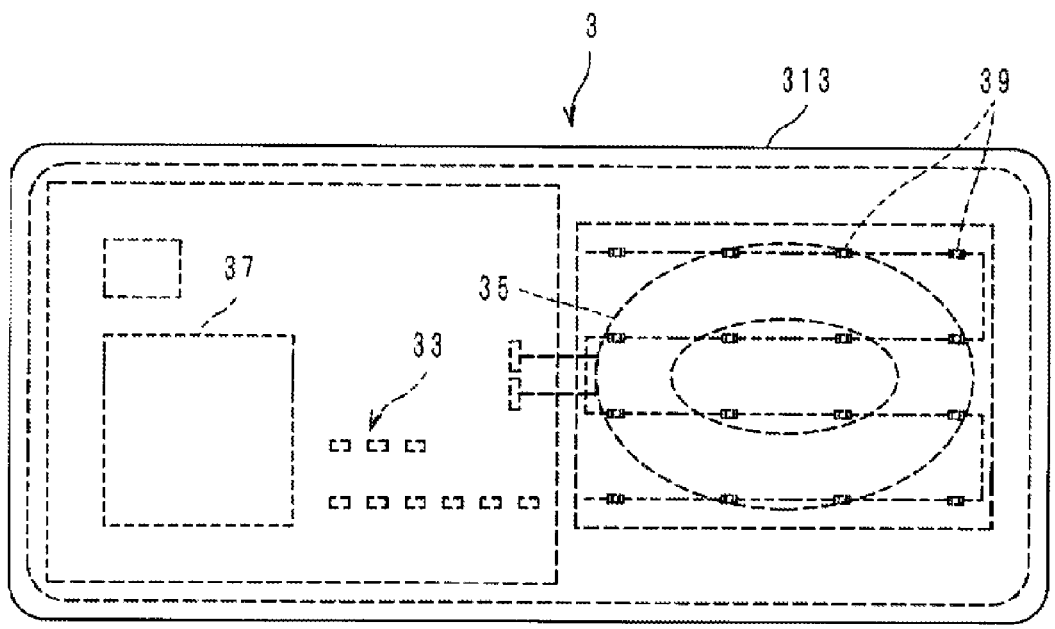
FIG. 2C is a top view of the power feeding device shown in FIG. 1.

The temperature-sensitive detector 39 is typically a ceramic thermistor with a negative temperature coefficient (hereinafter, referred to as an NTC thermistor). In this regard, in order to quickly respond to overheating of the objects, the temperature-sensitive detector 39 is preferably a small-size (for example, type 1005 specified in the JIS) NTC thermistor with a low heat capacity, for example. In this regard, when the size of the NTC thermistor is type 1005, the dimension is 1.0 mm along the Y axis, whereas the dimension is 0.5 mm along the X axis. In addition, the dimension along the Z axis is, for example, 0.25 mm, although the dimension is not specified in the JIS. In this regard, these dimensions are all designed target values, but not always accurately 1.0 mm, 0.5 mm, and 0.25 mm. More specifically, these dimensions all have tolerances. This temperature-sensitive detector 39 is provided between the surface of the cover 313 and an upper end of the primary coil 35. FIGS. 2A to 2C show an example of the temperature-sensitive detector 39 buried in the cover 313.

In addition, because it is not known where on the cover 313 the object is placed, it is preferable to have a plurality of temperature-sensitive detector 39, that is, a plurality of NTC thermistors arranged in a row, and bury the plurality of temperature-sensitive detectors 39 respectively at a number of different sites in the cover 313, as shown by dashed line in FIG. 2C. Thus, it becomes possible to detect the temperature at a number of sites on the cover 313.

The temperature-sensitive detector 39 has, for example, fixed resistances, not illustrated, connected in series. To this circuit, a constant voltage is supplied which is generated by a constant-voltage circuit, not illustrated. This circuit outputs, to the controller 37, the voltage-dividing potential with the fixed resistances as temperature information. The controller 37 performs stopping or the like of the power supply to the primary coil 35 when the input temperature information exceeds a predetermined temperature.

However, the primary coil 35 generates heat through power supply. More specifically, the cover 313 reaches a high temperature even in the absence of the power receiving device 5 or metal foreign bodies on the cover 313. Therefore, unless the temperature-sensitive detector 39 is provided at an appropriate distance from the surface of the cover 313 (in other words, the surface with the power receiving device 5 placed thereon), there is a possibility that the controller 37 will not be able to accurately detect the temperature of the object on the cover 313. Alternatively, when the distance is excessively long from the surface of the cover 313 to the temperature-sensitive detector 39, the controller 37 is unable to accurately detect the temperature of the object.

Figure 3:
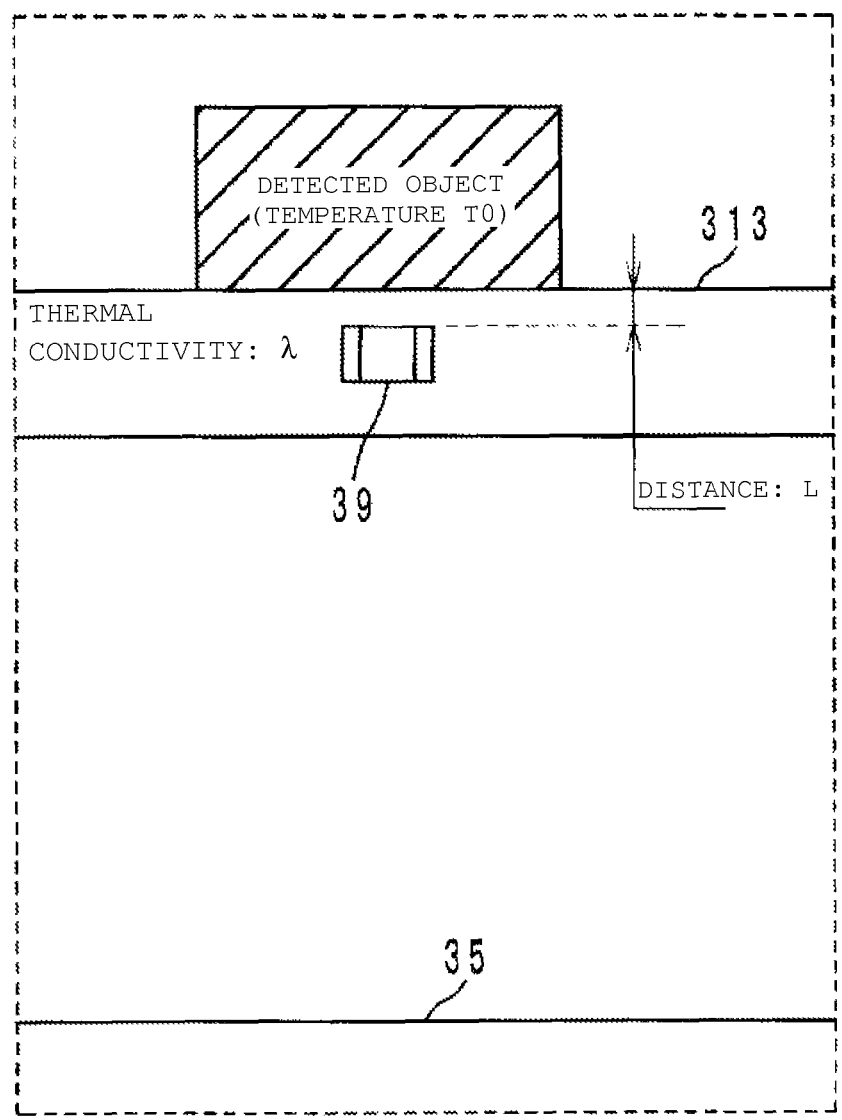
FIG. 3 is a diagram showing parameters related to the distance from the surface to the temperature-sensitive detector as shown in FIG. 2A.

In order to solve the problem mentioned above, the inventor of the present application has discovered an equation to derive a distance L in the vertical direction from the surface of the cover 313 to the temperature-sensitive detector 39. Specifically, as shown in FIG. 3, the temperature of the object placed on the surface of the cover 313 is denoted by $T_0$ [K], and the temperature of the object to be detected by the controller 37 is denoted by $T_1$ [K] (provided that $T_1 < T_0$). The thermal conductivity of the cover 313 is denoted by $\lambda$ [W/(m·K)]. In this case, the distance L [m] is designed to have a numerical value that satisfies the following equation (1). More specifically, the temperature-sensitive detector 39 is provided in a position just at the distance L [m] from the surface of the cover 313.

Formula 2

$$L \leq \frac{\lambda \times (T_0 - T_1)}{5 \times T_1} \qquad (1)$$

EXAMPLES

First Example

The object to be detected is an aluminum piece of about 5 [cm] square. In addition, the material of the cover 313 is an epoxy resin with a thermal conductivity $\lambda$ of about 0.25 [W/(m·K)]. When the aluminum piece was put on the cover 313, the temperature $T_0$ of the aluminum piece was increased to about 150 [° C.] under a calm condition at about 25 [° C.]. When safety, etc. of the power feeding device 3 are taken into account, the temperature-sensitive detector 39 desirably detects the existence of the aluminum piece at the temperature $T_1$ of, for example, about 130 [° C.] (temperature difference ($T_0 - T_1$): about 20° C.). In this case, the power feeding device 3 is designed so that the distance L is about 0.00248 [m] or less. It is to be noted that $T_0$ and $T_1$ are substituted in terms of absolute temperature in the equation (1), while $T_0$ and $T_1$ are referred in terms of degrees C., not in terms of absolute temperature, in the text and table from the perspective of ease of understanding.

The inventor of the present application actually prepared, with six distances L shown in Table 1 below, circuits with type 1005 NTC thermistors buried as the temperature-sensitive detector 39 in the cover 313 made of an epoxy resin (referred to as evaluation samples No. 1 to No. 6 in Table 1). In regard to the sample No. 1, the distance L was made to be about 50 [mm], and the distance L of the sample No. 2 was made to be about 20 [mm]. In regard to the samples Nos. 3 to 6, the distance L is as listed in Table 1.

TABLE 1

Change in Detected Temperature $T_1$ with Distance L in Example 1

| Evaluation Sample No. | Distance L [m] | Detected Temperature $T_1$ [° C.] | Temperature Difference $T_0 - T_1$ [° C.] | OK/NG |
|---|---|---|---|---|
| 1 | 50 | 64.9 | 85.1 | NG |
| 2 | 20 | 91.0 | 59.0 | NG |
| 3 | 10 | 110.5 | 39.5 | NG |
| 4 | 5 | 125.9 | 24.1 | NG |
| 5 | 2 | 134.2 | 15.8 | OK |
| 6 | 1 | 144.1 | 5.9 | OK |

The inventor placed an aluminum piece to be detected on the cover 313 for each sample, and measured the temperature$_1$ from the resistance value of the temperature-sensitive detector 39 saturated in the sample. Except for the distance L and the temperature $T_1$, the parameters $T_0$ and λ are described above. In addition, the measurement results are as shown in Table 1, and in the case of the samples Nos. 1 to 4, the temperature $T_1$ is lower than about 130 [° C.], and the temperature difference ($T_0-T_1$) is greater than about 20 [° C.]. It is determined that when the distance L fails to satisfy the equation (1) as just described, the temperature of the object on the cover 313 has failed to be accurately detected. In contrast, in the case of the samples Nos. 5 to 6, the temperature $T_1$ is about 130 [° C.] or higher, and the temperature difference ($T_0-T_1$) is about 20 [° C.] or less. It is determined that when the distance L satisfies the equation (1) as just described, the temperature of the object on the cover 313 can be accurately detected.

As described above, when the distance L from the surface of the cover 313 to the temperature-sensitive detector 39 in the power feeding device 3 is designed on the basis of the equation (1), the temperature of the object on the cover 313 is able to be accurately detected so that the distance L approximately corresponds to the designed target. Therefore, as long as the design conditions of λ, $T_1$, and $T_0$ are provided, it becomes possible to figure out the appropriate distance L without repeating the trial production and evaluation of the cover 313 with the temperature-sensitive detector 39 buried therein. Thus, the design efficiency of the power feeding device 3 is improved.

Second Example

The inventor further prepared, for the material of the cover 313, glass with a thermal conductivity λ of about 0.17 [W/(m·K)], instead of the epoxy resin. Also in this case, when an aluminum piece of about 5 [cm] square is regarded as an object to be detected in the same manner as described above, $T_0$ will be 150 [° C.]. In addition, when the temperature $T_1$ is set to about 130 [° C.] (temperature difference ($T_0-T_1$): about 20° C.), the distance L is about 0.00169 [m] or less from the equation (1).

The inventor of the present application prepared, with the six distances L shown in Table 2 below, circuits with type 1005 NTC thermistors buried as the temperature-sensitive detector 39 in the cover 313 made of the glass (referred to as evaluation samples No. 7 to No. 12 in Table 2). In regard to the sample No. 7, the distance L was made to be about 10 [mm], and the distance L of the sample No. 8 was made to be about 5 [mm]. In regard to the samples Nos. 9 to 12, the distance L is as listed in Table 2.

TABLE 2

Change in Detected Temperature $T_1$ with Distance L in Example 2

| Evaluation Sample No. | Distance L [m] | Detected Temperature $T_1$ [° C.] | Temperature Difference $T_0 - T_1$ [° C.] | OK/NG |
|---|---|---|---|---|
| 7 | 10 | 110.0 | 50.0 | NG |
| 8 | 5 | 117.9 | 32.1 | NG |
| 9 | 4 | 122.8 | 27.2 | NG |
| 10 | 3 | 128.2 | 21.8 | NG |
| 11 | 2 | 134.4 | 15.6 | OK |
| 12 | 1 | 141.6 | 8.4 | OK |

The inventor measured the temperature $T_1$ in the same way as in the case of the first example. The measurement results are as shown in Table 2, and in the case of the samples 7 to 10, the temperature $T_1$ is lower than about 130 [° C.]. Also in the second example, unless the distance L satisfies the equation (1), the temperature of the object on the cover 313 has failed to be accurately detected. In contrast, in the case of the samples Nos. 11 and 12, the temperature $T_1$ is about 130 [° C.] or higher, and also in the second example, when the distance L satisfies the equation (1), the temperature of the object on the cover 313 has succeeded in being accurately detected as designed for the target. In other words, it has been determined that the second example also produces the same effect as in the first example.

In the above-described examples of preferred embodiments of the present invention, the distance L has been described in the case of providing the temperature-sensitive detector 39 in the cover 313 of the power feeding device 3. However, the present invention is not limited thereto, but the distance L from the cover of the power receiving device 5 to the temperature-sensitive detector 39 may be defined on the basis of the equation (1).

In the above preferred embodiments of the present invention, the power feeding device 3 has been described for the application of charging smartphones, tablets, etc., for example. However, the present invention is not limited thereto, the power feeding device 3 may be intended for the application of charging consumer devices such as electric cars and shavers.

In addition, the temperature-sensitive detector 39 has been described as an NTC thermistor in the above preferred embodiments. However, the present invention is not limited thereto, the temperature-sensitive detector may be a PTC thermistor with a positive temperature coefficient. In addition, the thermistor may be not only a ceramic thermistor, but also a thermistor prepared from a polymer material.

In addition, the NTC thermistor is not limited to the type 1005, but may be type 3225, type 3216, type 2012, type 1608, type 0603, or type 0402. In this regard, the dimensions are as listed in Table 3 below along the X axis, along the Y axis, and along the Z axis.

TABLE 3

Size of NTC Ceramic Thermistor

| Type | Dimension along Y axis [mm] | Dimension along X axis [mm] | Dimension along Z axis [mm] |
|---|---|---|---|
| 3225 | 3.2 | 2.5 | 1.0 |
| 3216 | 3.2 | 1.6 | 1.0 |
| 2012 | 2.0 | 1.2 | 1.0 |
| 1608 | 1.6 | 0.8 | 0.4 |

TABLE 3-continued

Size of NTC Ceramic Thermistor

| Type | Dimension along Y axis [mm] | Dimension along X axis [mm] | Dimension along Z axis [mm] |
|---|---|---|---|
| 1005 | 1.0 | 0.5 | 0.25 |
| 0603 | 0.6 | 0.3 | 0.15 |
| 0402 | 0.4 | 0.2 | 0.1 |

The power feeding device and power receiving device according to various preferred embodiments of the present invention are able to accurately detect overheating of an object on the cover, and are suitable for contactless charging systems such as smartphones, tablet terminals, or electric cars.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power feeding device for supplying power in a contactless manner to a power receiving device, the power feeding device comprising:
   a cover;
   a coil covered with the cover and provided in a predetermined direction with respect to the cover; and
   a temperature-sensitive detector that detects a temperature of an object on the cover; wherein
   a distance from a surface of the cover to the temperature-sensitive detector in the predetermined direction is denoted by L [m], a temperature of an object to be subjected to thermometry by the temperature-sensitive detector is denoted by $T_0$ [K], a temperature to be detected by the temperature-sensitive detector is denoted by $T_1$ [K], and a thermal conductivity of the cover is denoted by $\lambda$ [W/(m·K)], and L satisfies:

$$L \leq \frac{\lambda \times (T_0 - T_1)}{5 \times T_1}.$$

2. The power feeding device according to claim 1, wherein the temperature-sensitive detector includes a plurality of thermistors arranged in a row.

3. The power feeding device according to claim 1, wherein the temperature-sensitive detector includes thermistors of type 1005.

4. The power feeding device according to claim 1, further comprising an adapter, a transmission system part group, a primary coil, and a primary controller.

5. The power feeding device according to claim 4, wherein the transmission system part group includes at least one of a rectifier circuit, a smoothing circuit, and an inverter circuit.

6. The power feeding device according to claim 1, wherein the temperature-sensitive detector is a negative temperature coefficient thermistor.

7. The power feeding device according to claim 1, wherein the temperature-sensitive detector includes a plurality of thermistors embedded in the cover.

8. The power feeding device according to claim 1, wherein the temperature-sensitive detector is one of a positive temperature coefficient thermistor and a polymer thermistor.

9. The power feeding device according to claim 1, wherein the temperature-sensitive detector includes thermistors of type 3225, type 3216, type 2012, type 1608, type 0603, or type 0402.

10. A contactless power transmission system comprising the power feeding device according to claim 1.

11. A power receiving device for receiving power transmitted in a contactless manner from a power feeding device, the power receiving device comprising:
    a cover;
    a coil covered with the cover and provided in a predetermined direction with respect to the cover; and
    a temperature-sensitive detector that detects a temperature of an object on the cover; wherein
    a distance from a surface of the cover to the temperature-sensitive detector in the predetermined direction is denoted by L [m], a temperature of an object to be subjected to thermometry by the temperature-sensitive detector is denoted by $T_0$ [K], a temperature to be detected by the temperature-sensitive detector is denoted by $T_1$ [K], and a thermal conductivity of the cover is denoted by $\lambda$ [W/(m·K)], and L satisfies:

$$L \leq \frac{\lambda \times (T_0 - T_1)}{5 \times T_1}.$$

12. The power receiving device according to claim 11, further comprising a secondary coil, a transmission system part group and a secondary controller.

13. The power receiving device according to claim 12, wherein the transmission system part group includes at least one rectifier circuit.

14. The power receiving device according to claim 11, wherein the temperature-sensitive detector includes a plurality of thermistors arranged in a row.

15. The power receiving device according to claim 11, wherein the temperature-sensitive detector includes thermistors of type 1005.

16. The power receiving device according to claim 11, wherein the temperature-sensitive detector is a negative temperature coefficient thermistor.

17. The power receiving device according to claim 11, wherein the temperature-sensitive detector includes a plurality of thermistors embedded in the cover.

18. The power receiving device according to claim 11, wherein the temperature-sensitive detector is one of a positive temperature coefficient thermistor and a polymer thermistor.

19. The power receiving device according to claim 11, wherein the temperature-sensitive detector includes thermistors of type 3225, type 3216, type 2012, type 1608, type 0603, or type 0402.

20. A contactless power transmission system comprising the power receiving device according to claim 11.

* * * * *